United States Patent

Schultz

[15] 3,671,005
[45] June 20, 1972

[54] SIDE MOUNTED REAR VIEW AUTOMOTIVE MIRROR ASSEMBLY AND MOUNTING BRACKET THEREFOR

[72] Inventor: Odetta B. Schultz, 1326 South San Gabriel Boulevard, San Gabriel, Calif. 91776

[22] Filed: Oct. 15, 1970

[21] Appl. No.: 80,883

[52] U.S. Cl.............................248/480, 248/285, 285/179, 285/302, 287/54
[51] Int. Cl.......................................................B60r 1/04
[58] Field of Search..................248/201, 285, 479, 480, 485, 248/486, 487; 350/307

[56] References Cited

UNITED STATES PATENTS 2,827,255  3/1958  Kampa....................................248/480
1,178,072  4/1916  Hoag.................................248/480 X
3,392,950  7/1968  Pierce.............................248/480 UX
3,282,549  11/1966  Crawford.............................248/480

Primary Examiner—William H. Schultz
Attorney—Robert Louis Finkel

[57] ABSTRACT

A side mounted rear view automotive mirror assembly including a mirror frame and mounting brackets at the frame ends having support arms extending transversely of the frame, pivoted bracket members at one end of the arms for attachment to the side of an automotive vehicle, and coupling means, such as L-shaped coupling members, at the opposite ends of the arms rotatably and telescopically joining the arms and frame in the manner which permits angular adjustment of the frame about its longitudinal axis as well as about a transverse axis generally parallel to the bracket support arms, endwise adjustment of the frame along its longitudinal axis, lateral adjustment of the frame lengthwise of the bracket arms, and installation of mirror frames of different sizes and shapes. A mounting bracket for the mirror assembly.

7 Claims, 4 Drawing Figures

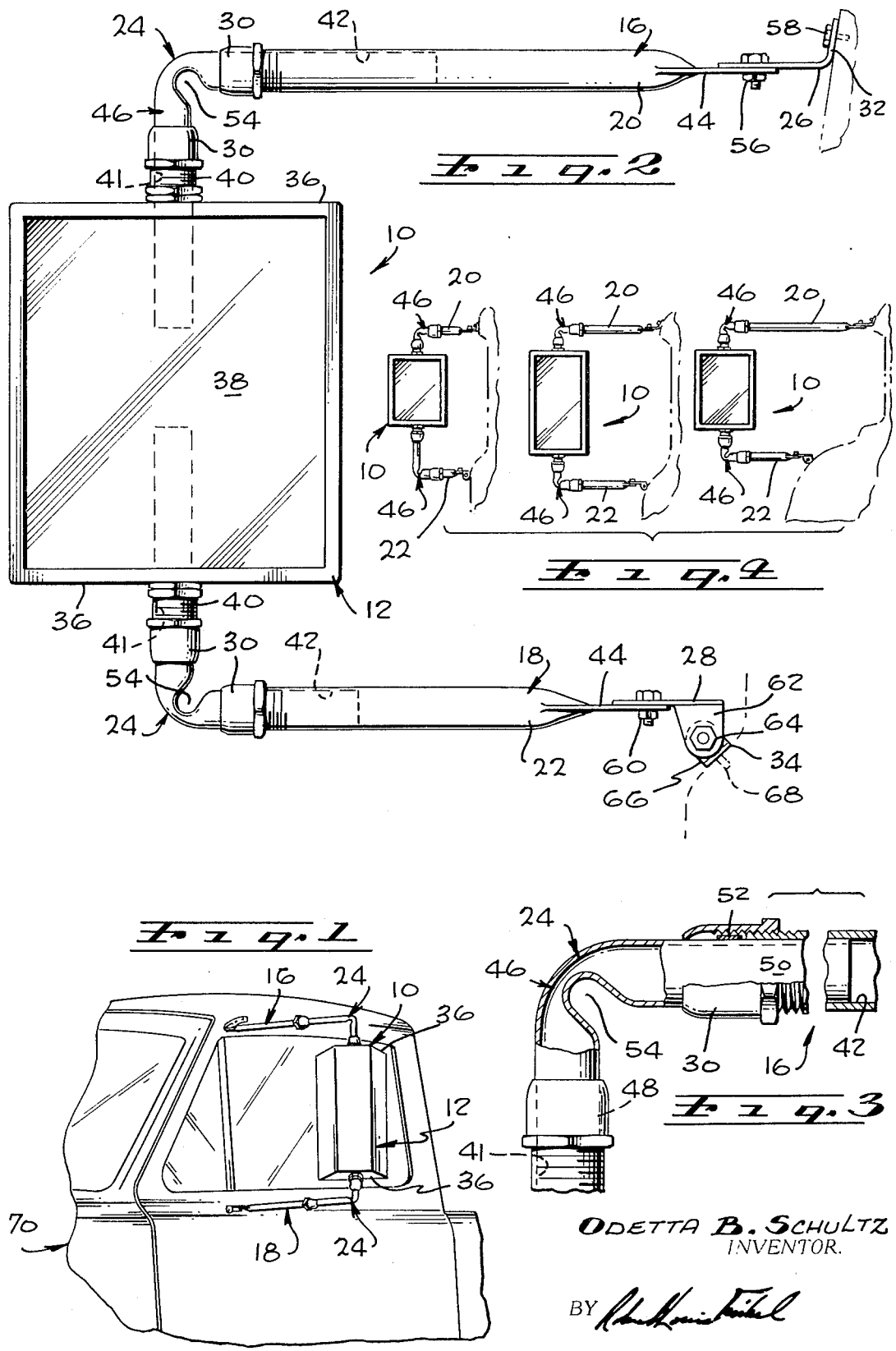

SIDE MOUNTED REAR VIEW AUTOMOTIVE MIRROR ASSEMBLY AND MOUNTING BRACKET THEREFOR

BACKGROUND OF THE INVENTION

1. Field of the Invention

This invention relates generally to accessories for automotive vehicles. More particularly, the invention relate a novel adjustable side mounted rear view automotive mirror assembly and to a unique adjustable mounting bracket for the mirror assembly.

2. Prior Art

Trucks and passager vehicles towing travel trailers and the like are required to have side mounted rear view mirrors. The prior art is replete with a vast assortment of such mirrors. Generally speaking, side mounted rear view mirror assemblies for this purpose are characterized by a narrow frame and one or more mounting brackets extending transversely of the frame for attaching the latter to the side of a vehicle in a manner such that the mirror is positioned some distance laterally outboard of the vehicle. The lateral projection of the mirror beyond the side of the vehicle is made sufficient to provide the driver with a clear field of view of the area to the rear of the vehicle. Such a mirror assembly is generally adjustable to accommodate its installation on different types of automotive vehicles and to enable the mirror to be set in the optimum position for each driver.

SUMMARY OF THE INVENTION

The present invention provides and improved side mounted ear view mirror assembly for the purpose described which is characterized by an increased range of adjustment which accommodates the mirror assembly to installation on virtually any type of automotive vehicle and enhances the ability of the mirror to be set in an optimum position for each individual driver. The invention also provides a novel mounting bracket for the mirror assembly.

The mirror assembly of the invention has an elongate mirror frame with normally upper and lower ends, and a pair of mounting brackets at the ends of the frame for attaching the latter to the sides of an automotive vehicle. These mounting brackets include arms which extend from the frame ends transverse to the longitudinal axis of the frame, coupling means joining the adjacent ends of the frame and bracket arms, and bracket members pivoted on the opposite ends of the arms for attaching the latter to the vehicle. The coupling means are uniquely constructed and arranged to permit relative angular and axial adjustment of the frame and bracket arms about and along their respective longitudinal axes and to cooperate with the pivoted bracket members on the arms to accommodate several different adjustments of the mirror frame. These adjustments include angular adjustment of the frame about its longitudinal axis as well as about a transverse axis generally parallel to the bracket arms, axial adjustment of the frame along its longitudinal axis, and lateral adjustment of the frame in the lengthwise direction of the bracket arms.

The bracket coupling means of a disclosed inventive embodiment comprises L-shape coupling members, These coupling members have mutually perpendicular ends on the longitudinal as of the bracket arms and mirror frame respectively, and are telescopically engaged by axial sockets provided on the adjacent frame and arm ends. Each end of each coupling member is actually slidable and rotatable in its respective socket and is fixed in adjusted position in the socket by releasable securing means.

According to an important feature of the invention, the members are constructed of metal tubes which are bent in such a way as to provide inset creases or indentations in the inner sides of the tube bends. These indentations provide maximum telescopic adjustment of the coupling members, bracket arms, and mirror frame, thereby extending the mirror adjustment range. Another feature of the invention resides in the fact that each coupling member has ends of different lengths and is reversible to further increase the adjustment range of the mirror and permit installation of mirror frames of different sizes and shapes.

When the mirror assembly is installed in an automotive vehicle, the mirror is adjustable toward and away from the vehicle to vary the projection of the mirror beyond the side of the vehicle. The mirror is also angularly adjustable around its longitudinal and transverse axes to control the field of view of the mirror from the driver's seat. As will be seen, the several adjustments of the mirror assembly greatly facilitate the installation of the latter on automotive vehicles of virtually any body size and style. Moreover, the mounting brackets of the mirror assembly are uniquely constructed to accommodate a range of mirror sizes and shapes.

BRIEF DESCRIPTION OF THE DRAWINGS

FIG. 1 is a perspective view of the subject side mounted rear view mirror assembly installed on an automotive vehicle;

FIG. 2 is an enlarged rear elevation of the mirror assembly;

FIG. 3 is an enlarged fragmentary detail, partly in section, of one coupling member of the mirror assembly; and FIG. 4 illustrates three different automotive installations of the subject rear view mirror assembly.

DESCRIPTION OF THE PREFERRED EMBODIMENTS

Referring first to FIGS. 2 and 3, the illustrated side mounted rear view mirror assembly 10 will be seen to comprise an elongate mirror frame 12 having normally upper and lower ends, and mounting brackets 16, 18 at the frame ends. These mounting brackets include support arms 20, 22 respectively, extending from the frame ends, transverse to the longitudinal axis of the frame, coupling means 24 joining the adjacent ends of the frame and bracket arms, and bracket members 26, 28 pivoted on the opposite ends of the arms on pivot axes transverse to the longitudinal axes of the arms. Coupling means 24 permit relative angular and axial adjustment of the mirror frame 12 and bracket arms 20, 22 about and along their respective longitudinal axes and include means 30 for securing the parts in adjusted relation. Bracket members 26, 28 have base portions 32, 34 for attachment to a vehicle, in the manner illustrated.

Describing the illustrated mirror assembly in more detail, the mirror frame 12 comprises a hollow hosing structure with parallel upper and lower end walls 36 and a rear opening containing a mirror 38 proper. Fixed to the end walls 36 on the longitudinal axis of the frame 12, and projecting externally of the frame, are tubes 40 containing sockets 41 which open through the outer ends of the tubes. The projecting outer ends of the tubes 40 are externally threaded.

The support arms 20, 22 of the mounting bracket 16, 18 are constructed of metal tubes. The end of each arm tubes adjacent the mirror frame provides a socket 42 opening through the tube end and is externally threaded. The opposite end of the arm tube is flattened to provide a tongue 44.

The bracket arm coupling means 24 comprises L-shape coupling members 46 having mutually perpendicular ends 48, 50 of different lengths. These ends are dimensioned to fit slidably within the mirror frame and tube sockets 41, 42. Accordingly, the mirror frame 12 and bracket arms 20,22 are angularly and axial adjustable relative to one another about and along their respective longitudinal axis. The securing means 30 for retaining these parts in adjusted relation comprise collars which are threaded on the frame socket tubes 40 and the bracket tubes 20, 22 and resilient rings 52 surrounding the ends 48, 50 of the coupling members 46. When the collars 30 are tightened, they compress the resilient rings 52 into firm frictional contact with the coupling member ends 48, 50, thus to firmly lock the parts against both relative rotation and axial movement.

According to a feature of the invention, the coupling members 46 comprise metal tubes which are bent in such a way as to provide indentations 54 at the inner side of the tube bends. These indentations provide clearance for the mirror frame socket and bracket arm tubes 40, 20, 22 to permit the ends 48, 50 of the coupling members to be inserted into the mirror frame and bracket arm sockets 40, 41 their entire length up to the inner corners of the bends in the coupling members. As a consequence, the range of relative axial adjustment of the ends of the coupling members in their respective mirror frame and bracket arm sockets is maximized.

The upper bracket member 26 in the drawings is an L-shape metal strap having one end pivotally attached to the tongue 44 of the upper bracket arm 20 by a bolt and nut 56. The opposite end of the bracket member strap is bent at an oblique angle to provide the base portion 32 of the bracket member. This base portion of the bracket member is apertured to receive a bolt 58 for attaching the bracket member to a vehicle. The other bracket member 28 comprises a strap pivotally attached to the tongue 44 of the lower bracket arm 22 by a bolt and nut 60. This latter strap has a flange 62 along one edge pivotally attached, by a bolt and nut 64, to a flange 66 on the mounting base portion 34 of the lower bracket member. This latter base portion is apertured to receive a bolt 68 for attaching the lower bracket member to a vehicle.

The mirror assembly 10 is installed in an automotive vehicle 70 by bolting the assembly arm bracket members 32, 34 to the side of he vehicle in the manner shown. When thus installed, the mirror assembly is capable of several adjustments. These adjustments include angular adjustment of the mirror frame 12 about its longitudinal axis as well as about a transverse axes generally parallel to the bracket arms 20, 22, axial adjustment of the mirror frame along its longitudinal axis, and lateral adjustment of the frame lengthwise of the bracket arms toward and away from the vehicle. Moreover, as shown in FIG. 4, the present mirror assembly accommodates mirror frames of various sizes and shapes. The mirror assembly may be also installed on vehicles of virtually any body shape and style, as is readily evident from the drawings. It is significant to note in connection with FIG. 4 that the coupling members or tubes 46 are reversible. This reversibility of the coupling members increases the range of adjustment of the mirror assembly and accommodates the latter to mirror frames of various sizes and shapes, as is readily evident from the drawings.

What is claimed is:

1. A side mounted rear view mirror assembly for an automotive vehicle, comprising:
   an elongate mirror frame having normally upper and lower ends, and
   mounting brackets at the ends of said frame for attaching the latter to the side of the vehicle including a pair of arms extending from said frame ends with the longitudinal axes of said arms transverse to the longitudinal axis of said frame, said arms having ends adjacent said frame and distal ends remote from said frame, coupling means joining the adjacent ends of said arms and frame for relative angular and axial adjustment of the frame and arms about and along the respective longitudinal axis, and bracket members pivotally secured to said distal ends of said arms on transverse axes of the arms and adapted for attachment to said vehicle.

2. A mirror assembly according to claim 1 wherein:
   said coupling means comprise generally L-shape coupling members having mutually perpendicular ends on the longitudinal axes of and rotatably and telescopically engaging the respective adjacent ends of said frame and arms, and means for releasably securing said frame, arms and coupling members against relative angular and axial movement.

3. A mirror assembly according to claim 2 wherein:
   said frame and arms have sockets receiving the adjacent ends of said coupling members, and
   said securing means comprise collars threaded on said frame and arms, and friction locking rings which are compressed by said collars into frictional locking engagement with the ends of said coupling members.

4. A mirror assembly according to claim 3 wherein:
   each coupling member has ends of differing lengths and is reversible to reverse the position of its ends in their respective frame and arm sockets.

5. A mirror assembly according to claim 1 wherein:
   said coupling means comprise generally L-shape coupling members having mutually perpendicular ends and intervening right angular bends, sockets in the adjacent ends of said frame and arms slidably and rotatably receiving the ends of said coupling members, and means for releasably securing said arms, frame and coupling members against relative angular and axial movement, and
   said coupling members comprise tubes having indentations at the inner sides of their bends to permit maximum relative axial adjustment of said coupling members, frame and arms.

6. A mirror assembly according to claim 5 wherein:
   each coupling member has ends of different lengths and is reversible to reverse the position of its ends in their respective sockets.

7. A mounting bracket for a side mounted rear view automotive vehicle mirror having an elongated frame with sockets opening to the frame ends on a common longitudinal axis of the frame, said bracket comprising:
   a support arm having an axial socket at one end thereof,
   a bracket member pivoted on the opposite end of said arm on a transverse axis of the arm,
   a tubular L-shaped coupling member having mutually perpendicular ends of unequal lengths and an intervening right angular bend having an indentation on its inner side,
   one end of said coupling member rotatably and telescopically engaging the socket of said arm for relative angular and axial adjustment of said coupling member and arm about and along the longitudinal axis of said arm,
   the other end of said coupling member being adapted for insertion into one socket of said mirror frame, and
   means for releasably securing said coupling member and arm against relative angular and axial movement, comprising a collar threaded on said arm and a resilient ring surrounding the adjacent end of said coupling member adapted to be compressed against said coupling member by said collar.

* * * * *